(12) United States Patent
Li et al.

(10) Patent No.: US 9,520,810 B2
(45) Date of Patent: Dec. 13, 2016

(54) THREE-LEVEL POWER CONVERTER AND POWER UNIT THEREOF

(71) Applicant: DELTA ELECTRONICS, INC., Taoyuan Hsien (CN)

(72) Inventors: Yan Li, Taoyuan Hsien (CN); Qinglong Zhong, Taoyuan Hsien (CN); Senlin Wen, Taoyuan Hsien (CN); Guangcheng Hu, Taoyuan Hsien (CN)

(73) Assignee: DELTA ELECTRONICS, INC., Taoyuan Hsien (CN)

( * ) Notice: Subject to any disclaimer, the term of this patent is extended or adjusted under 35 U.S.C. 154(b) by 16 days.

(21) Appl. No.: 14/799,566

(22) Filed: Jul. 14, 2015

(65) Prior Publication Data

US 2016/0094153 A1 Mar. 31, 2016

(30) Foreign Application Priority Data

Sep. 26, 2014 (CN) .......................... 2014 1 0503410

(51) Int. Cl.
| | |
|---|---|
| H05K 7/02 | (2006.01) |
| H02M 7/487 | (2007.01) |
| H02M 7/797 | (2006.01) |
| H02M 7/00 | (2006.01) |
| H05K 7/20 | (2006.01) |

(52) U.S. Cl.
CPC ............. *H02M 7/797* (2013.01); *H02M 7/487* (2013.01)

(58) Field of Classification Search
CPC ...... H02M 7/487; H02M 7/797; H02M 7/003; H02M 5/45; H05K 7/026; H05K 7/20

USPC 363/123; 361/611, 624, 637, 775; 174/68.2, 174/149 B; 307/82, 113, 147, 142; 438/59

See application file for complete search history.

(56) References Cited

U.S. PATENT DOCUMENTS

| | | | | |
|---|---|---|---|---|
| 5,528,073 | A * | 6/1996 | Gilmore ............ | H01L 23/49575 257/584 |
| 6,028,779 | A * | 2/2000 | Sakamoto ............. | H02M 7/003 363/132 |
| 6,456,516 | B1 * | 9/2002 | Bruckmann .......... | H02M 7/003 363/144 |
| 2010/0315776 | A1 * | 12/2010 | Ono ...................... | H02M 7/487 361/689 |
| 2011/0249402 | A1 * | 10/2011 | Hentschel ............. | H01L 23/473 361/699 |

(Continued)

*Primary Examiner* — Timothy J Dole
*Assistant Examiner* — Sisay G Tiku
(74) *Attorney, Agent, or Firm* — Yunling Ren; Eaton & Van Winkle

(57) ABSTRACT

Provided are a three-level power converter and a power unit thereof. The power unit includes a power switch module and a laminated busbar structure. The power switch module includes a first power semiconductor switch module and a clamping diode module, which have a first, second, and third terminal respectively. The laminated busbar structure includes a third, second, and first busbar layer laminated on the power switch module. The third busbar layer includes a first sub-busbar connecting to the first terminal of the first power semiconductor switch module, a second sub-busbar connecting to the third terminal of the first power semiconductor switch module and the first terminal of the clamping diode module, a third sub-busbar connecting to the second terminal of the clamping diode module and the third terminal of the second power semiconductor switch module, and a fourth sub-busbar connecting to the second terminal of the second power semiconductor switch module.

19 Claims, 11 Drawing Sheets

(56) References Cited

U.S. PATENT DOCUMENTS

| | | | | |
|---|---|---|---|---|
| 2014/0111959 A1* | 4/2014 | Li | ............... | H05K 7/026 361/809 |
| 2014/0254228 A1* | 9/2014 | Ying | ............... | H02M 7/5387 363/132 |
| 2014/0362627 A1* | 12/2014 | Sun | ............... | H02M 7/003 363/132 |
| 2015/0340157 A1* | 11/2015 | Wen | ............... | H01G 4/38 361/328 |
| 2015/0340962 A1* | 11/2015 | Zhang | ............... | H02M 7/003 363/84 |
| 2015/0340963 A1* | 11/2015 | Huang | ............... | H02M 7/219 363/126 |

* cited by examiner

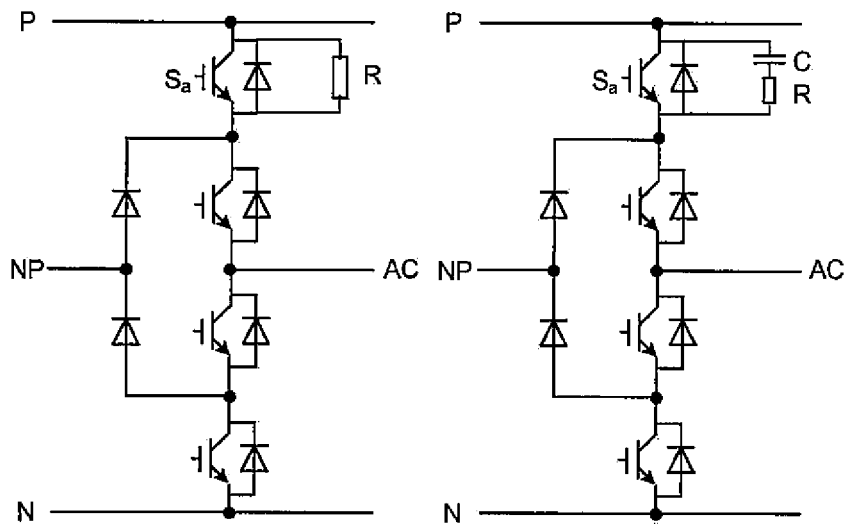
Fig.3A
(Prior art)
Fig.3B
(Prior art)
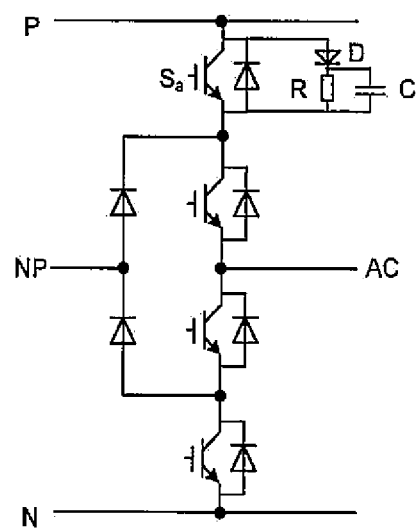
Fig.3C
(Prior art)

THREE-LEVEL POWER CONVERTER AND POWER UNIT THEREOF

CROSS REFERENCE TO RELATED APPLICATIONS

This application claims the priority to and the benefit of Chinese Patent Application No. 201410503410.8, filed Sep. 26, 2014 and entitled "three-level power converter and power unit thereof," which is incorporated herein by reference in its entirety.

TECHNICAL FIELD

The present disclosure relates to a three-level power converter and power unit thereof.

DESCRIPTION OF PRIOR ART

FIG. 1 illustrates a circuit topology schematic view for a power unit of a three-level power converter. $S_1$, $S_2$, $S_3$ and $S_4$ represent controllable power semiconductor switch device. $FWD_1$, $FWD_2$, $FWD_3$, and $FWD_4$ represent fly-wheel diode. $D_1$ and $D_2$ represent clamping diode. $C_1$ and $C_2$ represent dc-link capacitor. When the power unit works normally the voltage of the dc-link capacitor $C_1$ is defined to V2, and the voltage of the dc-link capacitor $C_2$ is defined to V2. That is, the maximum steady-state voltage withstood by $S_1$, $S_2$, $S_3$ and $S_4$, $FWD_1$, $FWD_2$, $FWD_3$, $FWD_4$, $D_1$ and $D_2$ is V2. The rated voltage of a semiconductor device is chosen about 2*V2 in order to ensure that the power unit works normally. Meanwhile, input or output AC Voltage is 0, V2 or 2*V2. It may be seen that based on three-level circuit topology theory, if the same power semiconductor switch device is adopted in the three-level converter, output AC voltage of three-level converter will be increased by one time, output or input power will be increased by one time, and harmonic content of output or input current will be reduced. As for a power semiconductor switch device applied for 690V two-level and low-voltage wind power converter existed in current market, e.g., maximum rated current of IGBT is 3600 A, output power of the two-level wind power converter is less than 2.5 MW, therefore, converter manufacturer generally adopt parallel power semiconductor switch device with power of 1-1.5 MW so as to reach a rated output power of 5-6 MW, which will increase the cost of the converter and cable, and decrease power density. Further, the price and performance of high power IGBT is not as good as that of normal IGBT. If output voltage of the converter is increased to 1140V or even 3.3 kV, 6 kV or 10 kV by middle-high voltage converting technique-multi-level, cascade or series, converter may use a power semiconductor switch device with higher performance price ratio so as to simply the structure of the converter and reduce the cost of cable and filter. In recent years, the converter with high voltage and high power are generally acceptable in this industry and would be the future development trends.

FIGS. 2A to 2D illustrate a three-level circuit topology schematic view for four kinds of commutation loop existed in a power unit of a three-level Neutral Point Clamped (abbreviated as NPC) converter respectively.

Referring to FIG. 2A, a commutation loop $Loop_1$ connects to AC end via dc-link capacitor $C_1$, controllable power semiconductor switch device $S_1$, clamping diode $D_1$, and conductors among these devices, as shown in the dotted lines and arrows in FIG. 2A. When the controllable power semiconductor switch device $S_1$ is turned off from an ON state, the current flowing through the controllable power semiconductor switch device $S_1$ is reduced, while the current flowing through the clamping diode $D_1$ is increased, therefore, voltage induced by stray inductance will be added to the controllable power semiconductor switch device $S_1$, which will increase electrical stress of the controllable power semiconductor switch device $S_1$.

Referring to FIG. 2B, a commutation loop $Loop_2$ flows through dc-link capacitor $C_1$, fly-wheel diode $FWD_1$, $FWD_2$, controllable power semiconductor switch device $S_3$, clamping diode $D_2$, and conductors among these devices from AC end, as shown in the dotted lines and arrows in FIG. 2B. When the controllable power semiconductor switch device $S_3$ is turned off from an ON state, the current flowing through the controllable power semiconductor switch device $S_3$ and clamping diode $D_2$ is reduced, while the current flowing through the fly-wheel diode $FWD_1$, $FWD_2$ is increased, therefore, voltage induced by stray inductance will be added to the controllable power semiconductor switch device $S_3$, which will increase electrical stress of the controllable power semiconductor switch device $S_3$.

Referring to FIG. 2C, a commutation loop $Loop_3$ flows through de-link capacitor $C_2$, controllable power semiconductor switch device $S_4$, clamping diode $D_2$, and conductors among these devices from AC end, as shown in the dotted lines and arrows in FIG. 2C. When the controllable power semiconductor switch device $S_4$ is turned off from an ON state, the current flowing through the controllable power semiconductor switch device $S_4$ is reduced, while the current flowing through the clamping diode $D_2$ is increased, therefore, voltage induced by stray inductance will be added to the controllable power semiconductor switch device $S_4$, which will increase electrical stress of the controllable power semiconductor switch device $S_4$.

Referring to FIG. 2D, When the controllable power semiconductor switch device $S_2$ is turned on from an ON state, a commutation loop $Loop_4$ connects to AC end via dc-link capacitor $C_2$, controllable power semiconductor switch device $S_2$, fly-wheel diode $FWD_3$, $FWD_4$, clamping diode $D_1$, and conductors among these devices, as shown in the dotted lines and arrows in FIG. 2D. The current flowing through the controllable power semiconductor switch device $S_2$ and clamping diode $D_1$ is reduced, while the current flowing through the fly-wheel diode $FWD_3$, $FWD_4$ is increased, therefore, voltage induced by stray inductance will be added to the controllable power semiconductor switch device $S_2$, which will increase electrical stress of the controllable power semiconductor switch device $S_2$.

It may be seen that in three-level power converter, when the ON/OFF state of the controllable power semiconductor switch device is switched, the voltage induced by stray inductance will increase electrical stress of the controllable power semiconductor switch device, which affects the performance of the controllable semiconductor device, and may damage the controllable semiconductor device, and improves the requirement for performance of the controllable semiconductor device, thus increases manufacturing cost. The above disadvantageous effect may be eliminated by decreasing the stray inductance of the power converter.

FIGS. 3A to 3C illustrate a three-level circuit topology schematic view for a power unit of a traditional three-level NPC converter, that is, snubber circuits are in parallel at both sides of the semiconductor switch device. A typical topological structure comprises resistor (R), resistor+capacitor (RC), and resistor+capacitor+diode (RCD) or the like. When the controllable power semiconductor switch device Sa is turned off, the voltage induced by the stray inductance will be absorbed by energy storage element on the snubber circuits, therefore, the voltage at both sides of the controllable power semiconductor switch device Sa will be reduced, which is a simple and effective means. However, when the controllable power semiconductor switch device Sa is turned on next time, the energy of the energy storage element on the snubber circuits will be released through the controllable power semiconductor switch device Sa, thus generating additional turn on consumption for the controllable power semiconductor switch device Sa, which degrades the dynamic performance of the controllable power semiconductor switch device. Further, the snubber circuit will go against the promotion of the power density and cost reduction.

SUMMARY

The present disclosure is to provide a power unit which may reduce stray inductance, and a three-level power converter having the power unit of the present disclosure.

In one aspect, the present disclosure provides a power unit. The power unit comprises a power switch module and a laminated busbar structure. The power switch module comprises a first power semiconductor switch module having a first terminal, a second terminal and a third terminal; a clamping diode module having a first terminal, a second terminal and a third terminal; a second power semiconductor switch module having a first terminal, a second terminal and a third terminal. The laminated busbar structure comprises a third busbar layer, a second busbar layer and a first busbar layer laminated on the power switch module. The first busbar layer electrically connects to the third terminal of the clamping diode module. The second busbar layer electrically connects to the second terminal of the first power semiconductor switch module and the first terminal of the second power semiconductor switch module respectively. The third busbar layer comprises a first sub-busbar, a second sub-busbar, a third sub-busbar and a fourth sub-busbar. The first sub-busbar electrically connects to the first terminal of the first power semiconductor switch module. The second sub-busbar electrically connects to the third terminal of the first power semiconductor switch module and the first terminal of the clamping diode module respectively. The third sub-busbar electrically connects to the second terminal of the clamping diode module and the third terminal of the second power semiconductor switch module respectively. The fourth sub-busbar electrically connects to the second terminal of the second power semiconductor switch module.

In another aspect, the present disclosure provides a three-level power converter. The three-level converter comprises foregoing a plurality of power units. The first connection terminals of the laminated busbar structure of each power unit are connected with each other by a conductor; the second connection terminals of the laminated busbar structure of each power unit are connected by a conductor; and the third connection terminals of the laminated busbar structure of each power unit are connected by a conductor.

The foregoing summary is not intended to summarize each potential embodiment or every aspect of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

FIGS. 3A to 3C illustrate a three-level circuit topology schematic view for a power unit of a traditional three-level NPC converter;

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Hereinafter, implementations of methods and apparatuses for processing short messages according to the embodiments of the present disclosure will be described in detail in conjunction with the drawings.

Embodiment 1 for a Power Unit

Figure 4A:
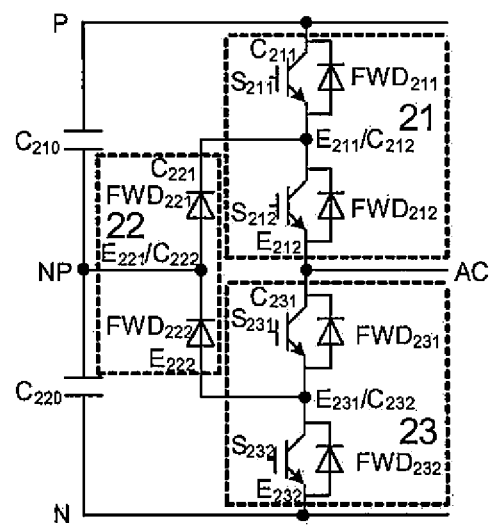
FIG. 4A illustrates a circuit topology schematic view for a power unit according to a first embodiment of the present disclosure.
Figure 4B:
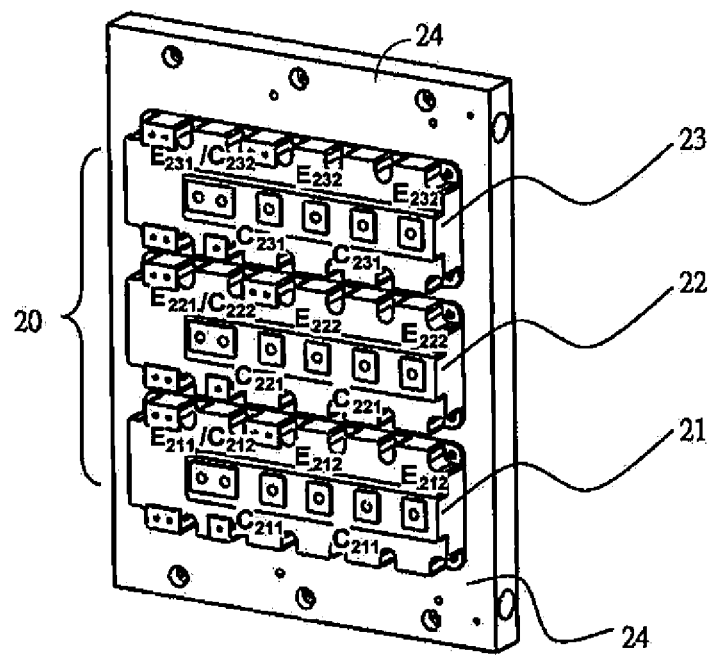
FIG. 4B illustrates a perspective schematic view of a power switch module of the power unit according to the first embodiment of the present disclosure.

Referring to FIG. 4A and FIG. 4B, a power unit according to a first embodiment of the present disclosure comprises a power switch module 20 and a laminated busbar structure. The power unit further comprises a heat sink 24 on which the power switch module 20 is provided. The power switch module 20 comprises a first power semiconductor switch module 21, a clamping diode module 22 and a second power semiconductor switch module 23. The first power semiconductor switch module 21, the clamping diode module 22, and the second power semiconductor switch module 23 are provided on the heat sink 24.

The first power semiconductor switch module 21 comprises a first power semiconductor switch $S_{211}$ and a second power semiconductor switch $S_{212}$ connected with each other in series, a first fly-wheel diode $FWD_{211}$ connected in parallel with the first power semiconductor switch $S_{211}$, and a second fly-wheel diode $FWD_{212}$ connected in parallel with the second power semiconductor switch $S_{212}$. The first power semiconductor switch $S_{211}$ and second power semiconductor switch $S_{212}$ may be full-controllable power semiconductor switch, such as Insulated Gate Bipolar Transistor (IGBT) or Metal-Oxide-Semiconductor Field Effect Transistor (MOSFET).

The clamping diode module 22 comprises a first diode $FWD_{221}$ and a second diode $FWD_{222}$.

The second power semiconductor switch module 23 comprises a third power semiconductor switch $S_{231}$ and a fourth power semiconductor switch $S_{232}$ connected with each other in series, a third fly-wheel diode $FWD_{231}$ connected in parallel with the third power semiconductor switch $S_{231}$, and a fourth fly-wheel diode $FWD_{232}$ connected in parallel with the fourth power semiconductor switch $S_{232}$. The third power semiconductor switch $S_{231}$ and the fourth power semiconductor switch $S_{232}$ may be full-controllable power semiconductor switch, such as Insulated Gate Bipolar Transistor (IGBT) or Metal-Oxide-Semiconductor Field Effect Transistor (MOSFET).

Figure 5A:
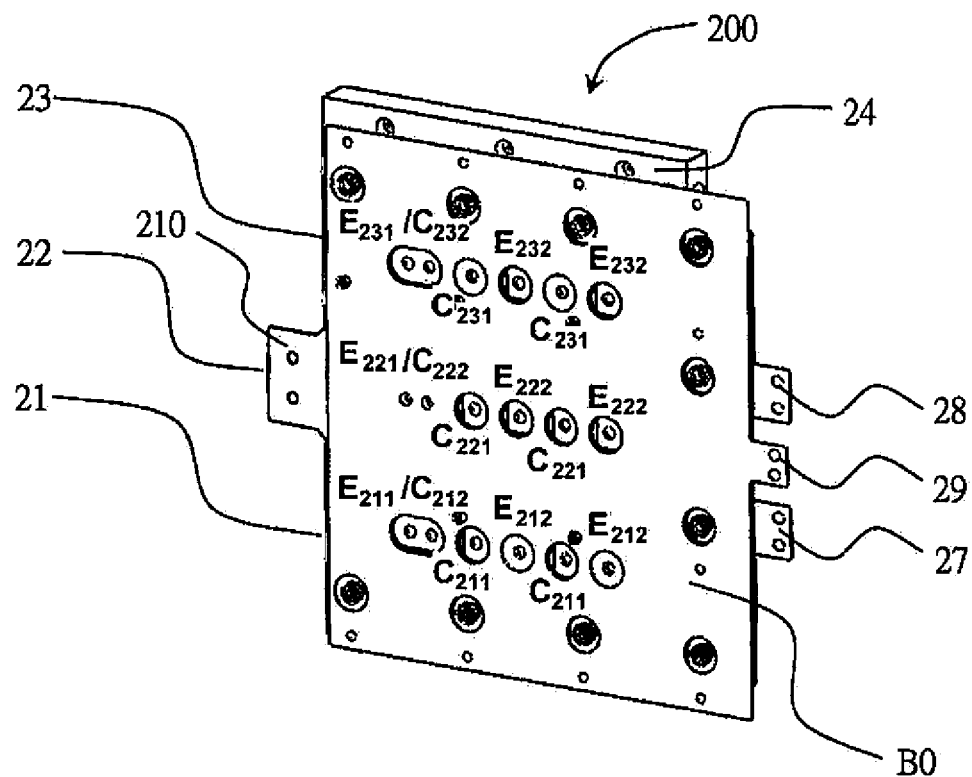
FIG. 5A illustrates a perspective schematic view showing relationship between the power switch module and laminated busbar structure of the power unit according to the first embodiment of the present disclosure.

Referring to FIG. 4B and FIG. 5A, in order to connecting to the laminated busbar structure, the power switch module 20 further comprises a connection structure which will be described in detail as follows.

The first power semiconductor switch module 21 of the power switch module 20 comprises a first terminal, a second terminal and a third terminal. The first terminal of the first power semiconductor switch module 21 may comprise two first sub-ends $C_{211}$ connected with each other, and the second terminal of the first power semiconductor switch module 21 may comprise two second sub-ends $E_{212}$ connected with each other.

The clamping diode module 22 of the power switch module 20 comprises a first terminal, a second terminal and a third terminal. The first terminal of the clamping diode module 22 may comprise two first sub-ends $C_{221}$ connected with each other, and the second terminal of the clamping diode module 22 may comprise two second sub-ends $E_{222}$ connected with each other.

The second power semiconductor switch module 23 of the power switch module 20 comprises a first terminal, a second terminal and a third terminal. The first terminal of the second power semiconductor switch module 23 may comprise two first sub-ends $C_{231}$ connected with each other, and the second terminal of the second power semiconductor switch module 23 may comprise two second sub-ends $E_{232}$ connected with each other.

Figure 5B:
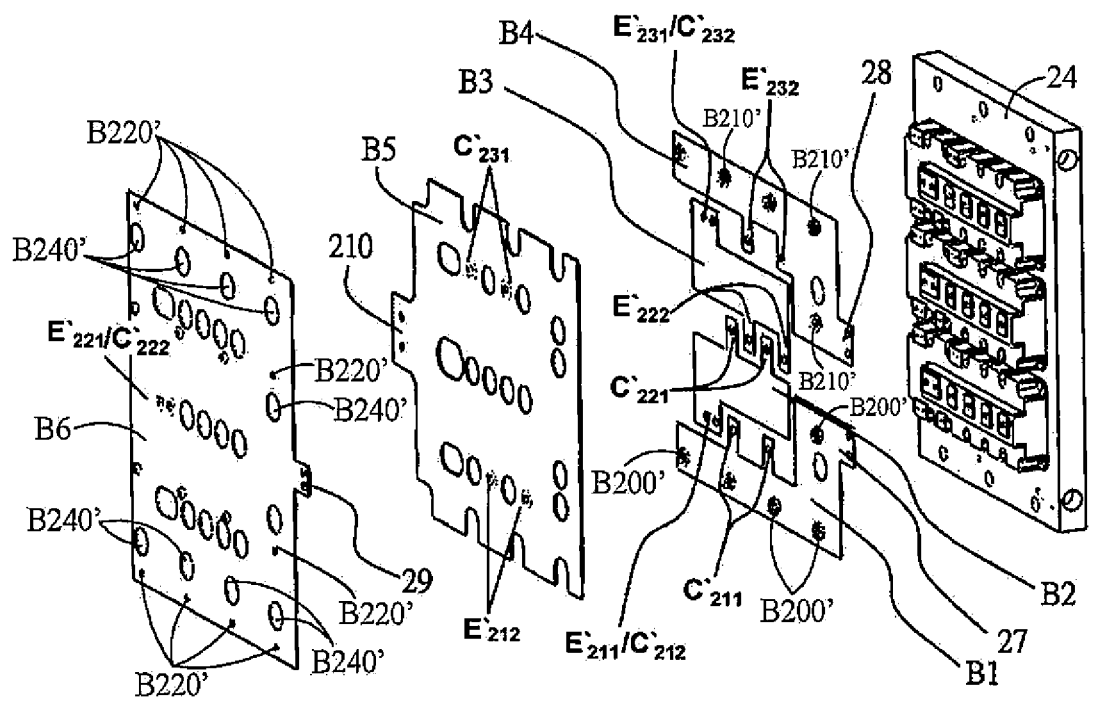
FIG. 5B illustrates a disassemble perspective schematic view showing relationship between the power switch module and laminated busbar structure of the power unit according to the first embodiment of the present disclosure.

Referring to FIG. 5A and FIG. 5B, in one embodiment the laminated busbar structure of the power unit is composed of a third busbar layer, a second busbar layer B5 and a first busbar layer B6 laminated on the power switch module 20. An insulation structure is set between every two of the third busbar layer, the second busbar layer B5 and the first busbar layer B6. The insulation structure may attach to a surface of any one of two neighbouring busbar layers, or both surfaces of the two adjoining busbar layers. The insulation structure may be independently set between the two adjoining busbar layers by means of pressing, adhering or the like to ensure an effective attachment with adjoining busbar layers and effective isolation.

The third busbar layer is set on the power switch module 20. In one embodiment, the first busbar layer B6 is set on the third busbar layer, the second busbar layer B5 is set on the first busbar layer B6. In another embodiment, the second busbar layer B5 is set on the third busbar layer, the first busbar layer B6 is set on the second busbar layer B5. That is, the positions of the first busbar layer B6 and second busbar layer B5 may be interchangeable.

In the present embodiment, the three busbar layers are laminated layer by layer, such that the structure may be compact, and current flowing through the three busbar layers are substantially symmetrical and in the opposite direction, thus effectively reducing stray inductance of the power unit in the three-level power converter, and reducing electrical stress of the power switch module 20.

Figure 5C:
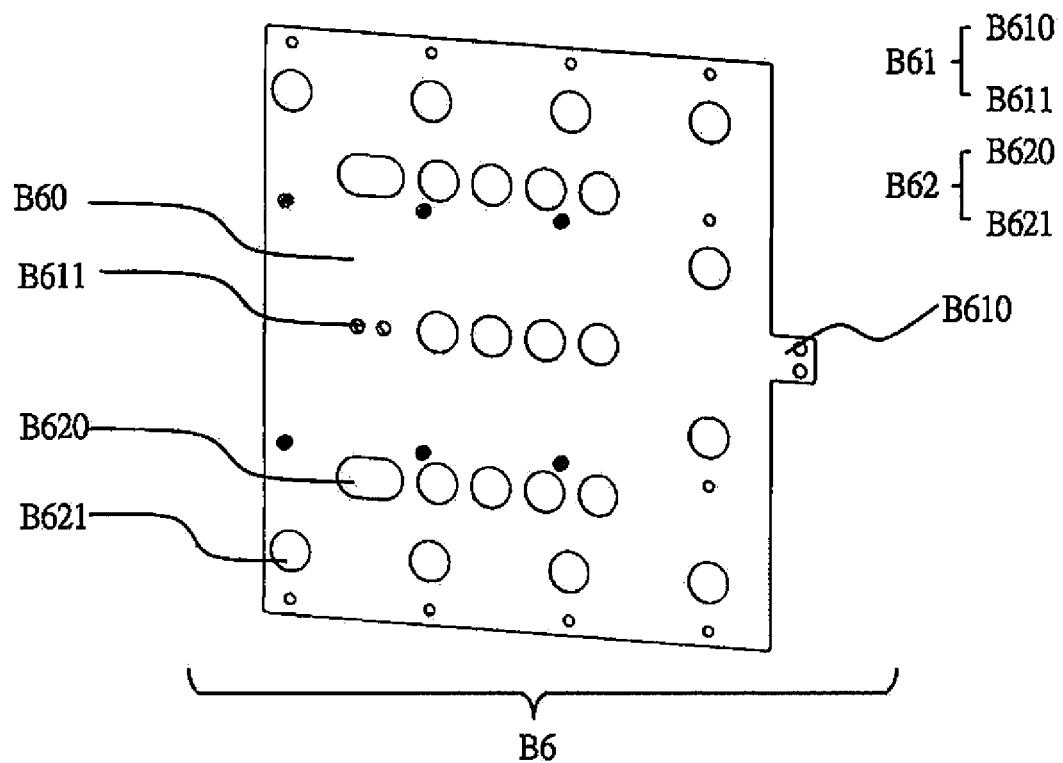
FIG. 5C illustrates a schematic view of the first busbar layer in the power unit according to the first embodiment of the present disclosure.

Referring to FIG. 5C, the structure of each busbar layer is described with the example of the first busbar layer B6. The first busbar layer B6 comprises a conduction part B60, a connection part B61 and an inconnection part B62. The conduction part B60 is used to provide current path for the power switch module 20. The connection part B61 is used to connect the conduction part B60 with external device, such as motor, cable, capacitor module and power switch module 20, through an effective connection manner, such as connection hole. Depending on different connection objects, the connection part B61 may comprise a connection terminal B610 or a connection hole 611. In case that the first busbar layer B6 connects to a corresponding terminal of the power switch module 20 via the connection hole B611, the connection hole B611 may be set above the corresponding terminal of the power switch module 20, and through holes may be respectively set at positions of the second busbar layer B5 and the third busbar layer of the laminated busbar structure corresponding to the connection hole B611. In addition, based on actual situation, the connection part B61 may be obtained by many manners, for example, it is a bending part bending towards a space, or a rivet, a protrusion, a recessing, a stud, a buckle or the like. The inconnection part B62, e.g. a through hole, may comprise at least one of a long strip through hole B620, circular through hole B621 or the like. The shape of the through hole may also be square, race track-shaped or the like. For example, the connection terminal B610 may be applied as a third connection terminal 29 as shown in FIG. 5A.

In an embodiment, the projection region of the first busbar layer B6 on the power switch module 20 completely covers the projection region of the third busbar layer on the power switch module 20, that is, the first busbar layer B6 at the outer completely covers the second busbar layer B5 and the third busbar layer at the inner, such that the stray inductance in the power unit 20 will be reduced.

In an embodiment, the projection region of the second busbar layer B5 on the power switch module 20 covers the projection region of a second sub-busbar B2 and a third sub-busbar B3 of the third busbar layer on the power switch module 20. Obviously, the projection region of the second busbar layer B5 on the power switch module 20 may also cover the projection region both of a first sub-busbar B1 and a fourth sub-busbar B4 of the third busbar layer.

The connection structure of the laminated busbar structure and power switch module 20 will be described as follows.

Referring to FIG. 4A, FIG. 5A and FIG. 5B, the first busbar layer B6 of the laminated busbar structure electrically connects to the third terminal $E_{221}/C_{222}$ of the clamping diode module 22.

The second busbar layer B5 of the laminated busbar structure electrically connects to the second end of the first power semiconductor switch module 21 and the first terminals $C_{231}$ of the second power semiconductor switch module 23 respectively.

The third busbar layer of the laminated busbar structure comprises a first sub-busbar B1, a second sub-busbar B2, a third sub-busbar B3 and a fourth sub-busbar B4.

The first sub-busbar B1 electrically connects to the first terminals $C_{211}$ of the first power semiconductor switch module 21.

The second sub-busbar B2 electrically connects to the third terminal $E_{211}/C_{212}$ of the first power semiconductor switch module 21 and the first terminals $C_{221}$ of the clamping diode module 22 respectively.

The third sub-busbar B3 electrically connects to the second terminals $E_{222}$ of the clamping diode module 22 and the third terminal $E_{231}/C_{232}$ of the second power semiconductor switch module 23 respectively.

The fourth sub-busbar B4 electrically connects to the second terminals $E_{232}$ of the second power semiconductor switch module 23.

In an embodiment, the first, second and third terminal of the first power semiconductor switch module 21 may connect to the laminated busbar structure through connection holes at the laminated busbar structure, which will be described in detail as follow.

The first sub-busbar B1 comprises two connection holes $C'_{211}$ electrically connecting to two first sub-terminals $C_{211}$ of the first power semiconductor switch module 21 respectively.

The second busbar layer B5 comprises two connection holes $E'_{212}$ electrically connecting to the two second sub-terminals $E_{212}$ of the first power semiconductor switch module 21 respectively.

The second sub-busbar B2 comprises a connection hole $E'_{211}/C'_{212}$ electrically connecting to the third terminal $E_{211}/C_{212}$ of the first power semiconductor switch module 21.

The second busbar layer B5 comprises through holes respectively corresponding to the connection holes $C'_{211}$ of the first sub-busbar B1 and the connection hole $E'_{211}/C'_{212}$ of the second sub-busbar B2.

The first busbar layer B6 comprises through holes respectively corresponding to the connection holes $C'_{211}$ of the first sub-busbar B1, the connection hole $E'_{211}/C'_{212}$ of the second sub-busbar B2 and the connection holes $E'_{212}$ of the second busbar layer B5.

In an embodiment, the first, second and third terminal of the clamping diode module 22 may connect to the laminated busbar structure through connection holes at the laminated busbar structure, which will be described in detail as follow.

The second sub-busbar B2 comprises two connection holes $C'_{221}$ respectively electrically connecting to the two first sub-terminals $C_{221}$ of the clamping diode module 22.

The third sub-busbar B3 comprises two connection holes $E'_{222}$ respectively electrically connecting to the two second sub-terminals $E_{222}$ of the clamping diode module 22.

The first busbar layer B6 comprises a connection hole $E'_{221}/C'_{222}$ electrically connecting to the third terminal $E_{221}/C_{222}$ of the clamping diode module 22.

The second busbar layer B5 comprises through holes respectively corresponding to the connection holes $C'_{221}$ of the second sub-busbar B2, the connection holes $E'_{222}$ of the third sub-busbar B3 and the connection hole $E'_{221}/C'_{222}$ of the first busbar layer B6.

The first busbar layer B6 comprises through holes respectively corresponding to the connection holes $C'_{221}$ of the second sub-busbar B2 and the connection holes $E'_{222}$ of the third sub-busbar B3.

In an embodiment, the first, second and third terminal of the second power semiconductor switch module 23 may connect to the laminated busbar structure through connection holes at the laminated busbar structure, which will be described in detail as follow.

The second busbar layer B5 comprises connection holes $C'_{231}$ respectively electrically connecting to the two first sub-ends $C_{231}$ of the second power semiconductor switch module 23.

The fourth sub-busbar B4 comprises connection holes $E'_{232}$ respectively electrically connecting to the two second sub-terminals $E_{232}$ of the second power semiconductor switch module 23.

The third sub-busbar B3 comprises a connection hole $E'_{231}/C'_{232}$ electrically connecting to the third terminal $E_{231}/C_{232}$ of the second power semiconductor switch module 23.

The second busbar layer B5 comprises through holes respectively corresponding to the connection holes $E'_{232}$ of the fourth sub-busbar B4 and the connection hole $E'_{231}/C'_{232}$ of the third sub-busbar B3.

The first busbar layer B6 comprises through holes respectively corresponding to the connection holes $E'_{232}$ of the fourth sub-busbar B4, the connection hole $E'_{231}/C'_{232}$ of the third sub-busbar B3 and the connection holes $C'_{231}$ of the second busbar layer B5.

In an embodiment, the first sub-busbar B1 of the laminated busbar structure is provided with a first connection terminal 27 configured to connect to a positive DC end P. The fourth sub-busbar B4 is provided with a second connection terminal 28 configured to C) connect to a negative DC end N. The first busbar layer B6 is provided with a third connection terminal 29 configured to connect to a neutral point voltage end NP. The second busbar layer B5 is provided with a fourth connection terminal 210 configured to connect to an AC end.

Referring to FIG. 5A and FIG. 5B, the first busbar layer B6 is an integral structure, and independently located at the outer layer of the laminated busbar structure. The working voltage between the first busbar layer B6 and second busbar layer B5 is half of the whole DC voltage of the three-level power converter. The second busbar layer B5 is middle layer of the laminated busbar structure. The working voltage between the first busbar layer B6 and second busbar layer B5 is half of the whole DC voltage of the three-level power converter, and the maximum working voltage between the second busbar layer B5 and any sub-busbar of the third busbar layer is equal to the whole DC voltage of the three-level power converter. However, each isolation voltage between the sub-busbars in the third busbar layer, i.e.

between the first sub-busbar B1 and second sub-busbar B2, between the second sub-busbar B2 and third sub-busbar B3, between the third sub-busbar B3 and fourth sub-busbar B4, is half of the whole DC voltage. In the present embodiment, the whole DC working voltage is equal to the DC voltage between the positive DC end P and negative DC end N.

With reference to FIG. 6A to 6D, the effect to the stray inductance in the three-level power converter by the laminated busbar structure according to the present embodiment will be described in detail below.

Figure 1:
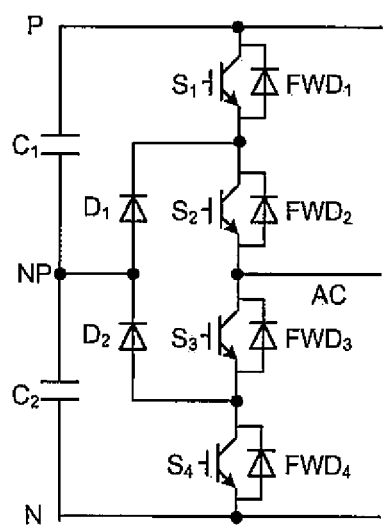
FIG. 1 illustrates a circuit topology schematic view for a power unit of a three-level power converter.
Figure 2A:
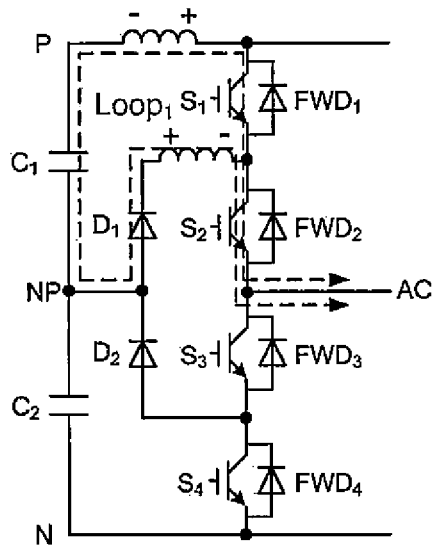
FIGS. 2A to 2D respectively illustrate a three-level circuit topology schematic view for four kinds of commutation loop existed in a power unit of an NPC converter.
Figure 6A:
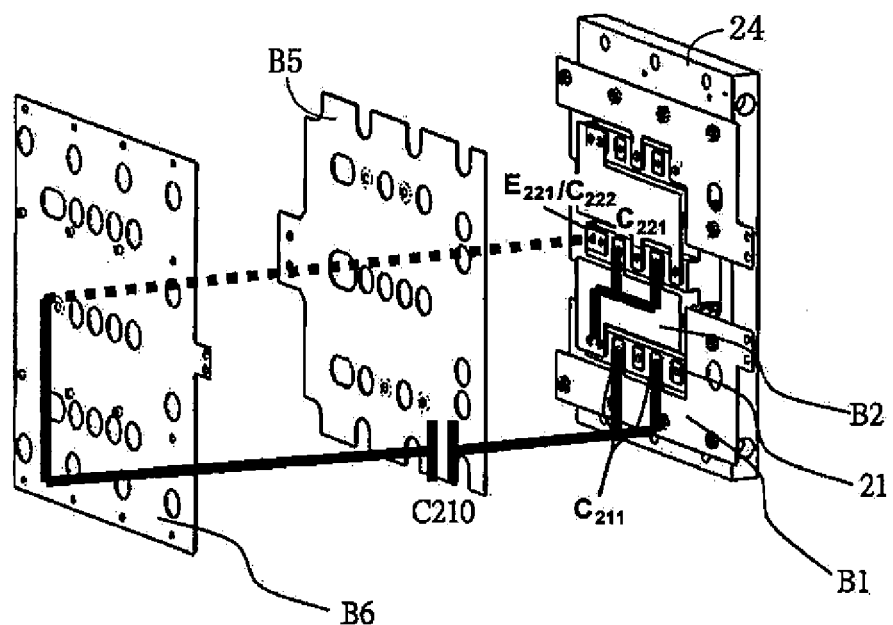
FIG. 6A illustrates an arrangement schematic view of a commutation loop 1 in the power unit according to the first embodiment of the present disclosure.

Referring to FIG. 6A combining with FIG. 2A, when the first power semiconductor switch $S_{211}$ in the first power semiconductor switch module 21 is turned off, the commutation loop 1 flows through the first sub-busbar B1, the internal of the first power semiconductor switch module 21, second sub-busbar B2, the internal of the clamping diode module 22 and first busbar layer B6. In particular, the current path of the commutation loop 1 is: $C_{210}$-$C_{211}$-$E_{211}$/$C_{212}$-$C_{221}$-$E_{221}$/$C_{222}$-$C_{210}$, that is, the current path starts from an anode of the positive bus capacitor bank $C_{210}$, flows through the first sub-busbar B1 to the first sub-terminals $C_{211}$ of the first power semiconductor switch module 21, then run out from the third terminal $E_{211}$/$C_{212}$ of the first power semiconductor switch module 21, flows through the second sub-busbar B2 to the first sub-terminals $C_{221}$ of the clamping diode module 22, and then run out from the third terminal $E_{221}$/$C_{222}$ of the clamping diode module 22, flows through the first busbar layer B6 to the cathode of the positive bus capacitor bank $C_{210}$, that is, ends at the anode of the negative bus capacitor bank $C_{220}$. The first busbar layer B6 is formed at a panel different from the panel at which the first sub-busbar B1 or second sub-busbar B2 is formed, and the commutation loop 1 flows through the first sub-busbar B1 and second sub-busbar B2. Furthermore, the first busbar layer B6 completely covers the first sub-busbar B1 and second sub-busbar B2. Therefore, the current path in the first busbar layer B6 coincides with the current path of the commutation loop 1 which flows through the first sub-busbar B1 and second sub-busbar B2, and the directions of the current flowing through these paths are opposite. Consequently, the stray inductance is very small. The higher the coincidence degree of commutation loop 1 is, the smaller the stray inductance generated by the commutation loop 1 is.

Figure 2B:
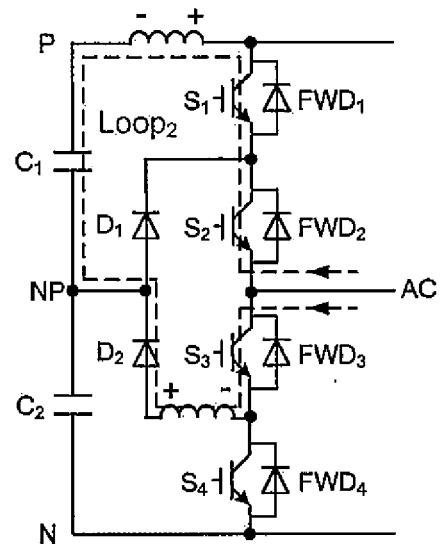
Figure 6B:
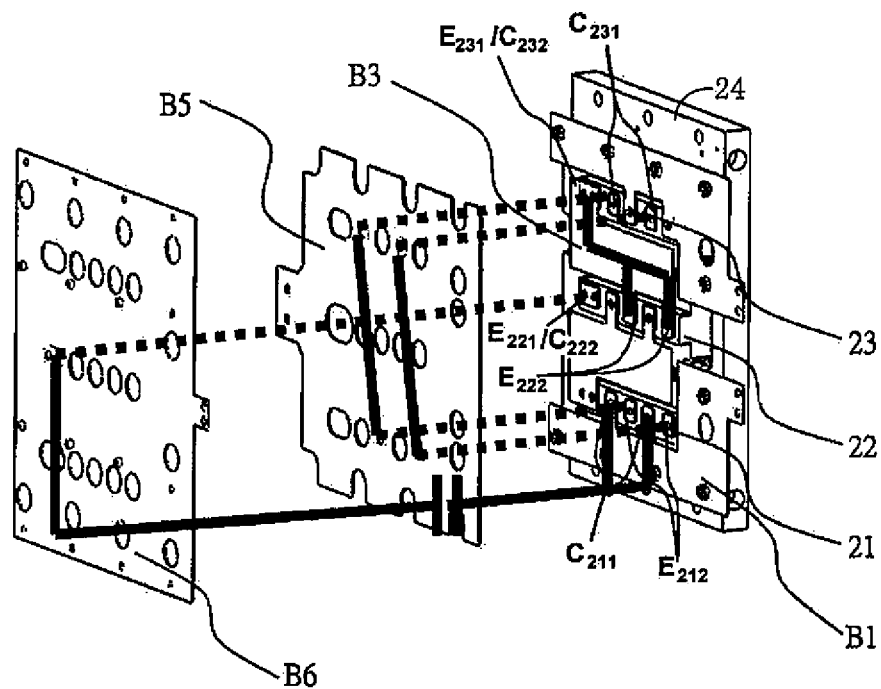
FIG. 6B illustrates an arrangement schematic view of a commutation loop 2 in the power unit according to the first embodiment of the present disclosure.

Referring to FIG. 6B combining with FIG. 2B, when the third power semiconductor switch $S_{231}$ in the second power semiconductor switch module 23 is turned off, the commutation circuit 2 flows through the first sub-busbar B1, the first power semiconductor switch module 21, the second busbar layer B5, the second power semiconductor switch module 23, the third sub-busbar B3, the clamping diode module 22 and the first busbar layer B6. In particular, the current path of the commutation loop 2 is: $C_{210}$-$C_{211}$-$E_{212}$-$C_{231}$-$E_{231}$/$C_{232}$-$E_{222}$-$E_{221}$/$C_{222}$-$C_{210}$, that is, the current path starts from an anode of the positive bus capacitor bank $C_{210}$, flows through the first sub-busbar B1 to the first sub-terminals $C_{211}$ of the first power semiconductor switch module 21, then run out from the second sub-terminals $E_{212}$ of the first power semiconductor switch module 21, flows through the second busbar layer B5 to the first sub-terminals $C_{231}$ of the second power semiconductor switch module 23, and then run out from the third terminal $E_{231}$/$C_{232}$ of the second power semiconductor switch module 23, flows through the third sub-busbar B3 to the second sub-ends $E_{222}$ of the clamping diode module 22, run out from the third terminal $E_{221}$/$C_{222}$ of the clamping diode module 22, flows through the first busbar layer B6, and ends at the cathode of the positive bus capacitor bank $C_{210}$. Part of the second busbar layer B5 is formed at a panel different from the panel at which the third sub-busbar B3 is formed, and the commutation loop 2 flows through the third sub-busbar B3; Furthermore, the part of the second busbar layer B5 completely covers the third sub-busbar B3; the first busbar layer B6 is formed at a panel different from the panel at which the first sub-busbar B1 and second busbar layer B5 are formed, and the commutation loop 2 flows through the first sub-busbar B1 and second busbar layer B5. Furthermore, the first busbar layer B6 completely covers the first sub-busbar B1 and second busbar layer B5. Therefore, the current path in the first busbar layer B6 coincides with the current path of the commutation loop 2 which flows through the first sub-busbar B1 and second busbar layer B5, and the directions of the current flowing through these paths are opposite, Consequently, the stray inductance is very small. The higher the coincidence degree of commutation loop 2 is, the smaller the stray inductance generated by the commutation loop 2 is.

Figure 2C:
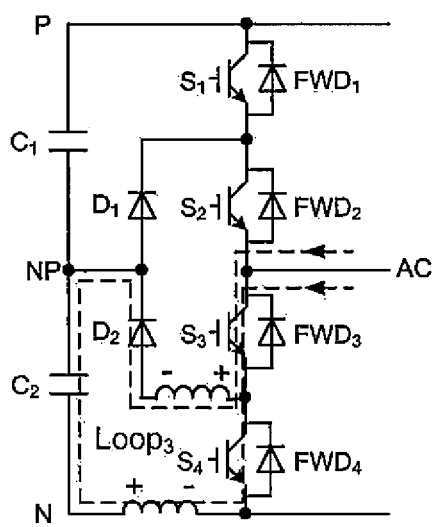
Figure 6C:
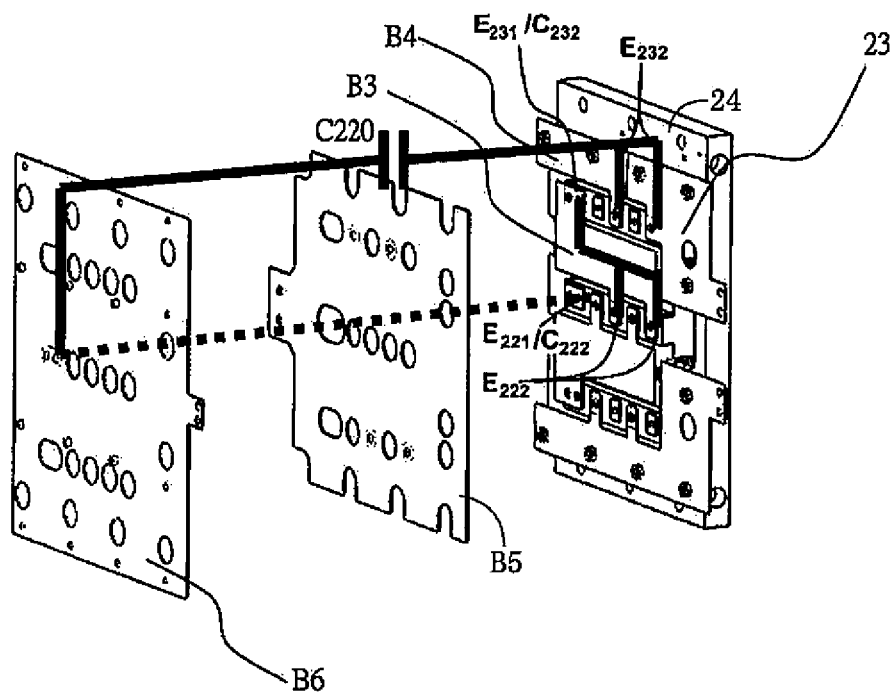
FIG. 6C illustrates an arrangement schematic view of a commutation loop 3 in the power unit according to the first embodiment of the present disclosure.

Referring to FIG. 6C combining with FIG. 2C, when the fourth power semiconductor switch $S_{232}$ in the second power semiconductor switch module 23 is turned off, the commutation circuit 3 flows through the fourth sub-busbar B4, the internal of the second power semiconductor switch module 23, third sub-busbar B3, clamping diode module 22 and first busbar layer B6. In particular, the current path of the commutation circuit 3 is: $C_{220}$-$E_{221}$/$C_{222}$-$E_{222}$-$E_{231}$/$C_{232}$-$E_{232}$-$C_{220}$, that is, the current path starts from an anode of the negative bus capacitor bank C220, flows through the first busbar layer B6 to the third terminal $E_{221}$/$C_{222}$ of the clamping diode module 22, then run out from the second sub-terminals $E_{222}$ of the clamping diode module 22, flows through the third sub-busbar B3 to the third terminal $E_{231}$/$C_{232}$ of the second power semiconductor switch module 23, and then run out from the second sub-terminals $E_{232}$ of the second power semiconductor switch module 23, flows through the fourth sub-busbar B4, and ends at the cathode of the negative bus capacitor bank $C_{220}$. The first busbar layer B6 is formed at a panel different from the panel at which the third sub-busbar B3 and the fourth sub-busbar B4 are formed, and the commutation circuit 3 flows through the third sub-busbar B3 and the fourth sub-busbar B4. Furthermore, the first busbar layer B6 completely covers the third sub-busbar B3 and the fourth sub-busbar B4. Therefore, the current path in the first busbar layer B6 coincides with the current path of the commutation circuit 3 which flows through the third sub-busbar B3 and the fourth sub-busbar B4, and the directions of the current flowing through these paths are opposite. Consequently, the stray inductance is very small. The higher the coincidence degree of commutation circuit 3 is, the smaller the stray inductance generated by the commutation circuit 3 is.

Figure 2D:
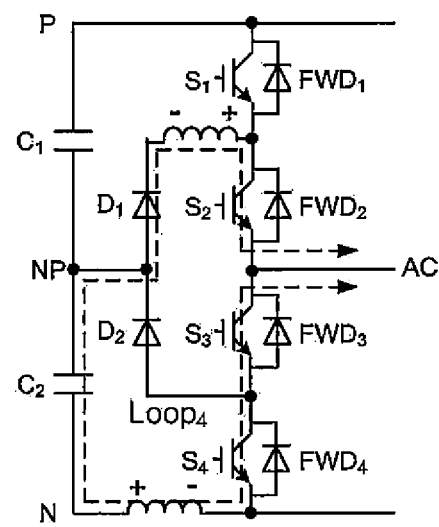
Figure 6D:
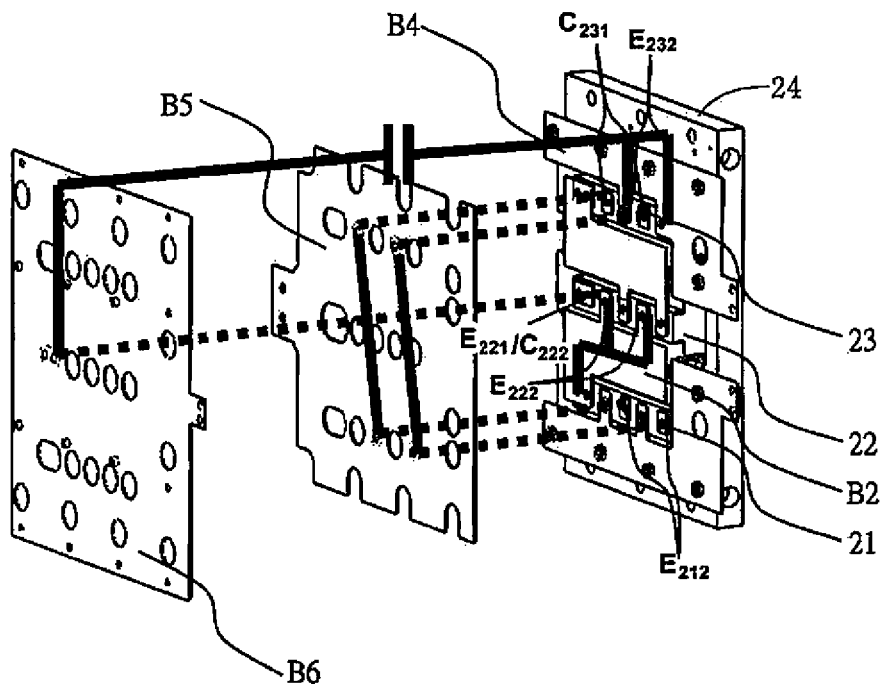
FIG. 6D illustrates an arrangement schematic view of a commutation loop 4 in the power unit according to the first embodiment of the present disclosure.

Referring to FIG. 6D combining with FIG. 2D, when the second power semiconductor switch $S_{212}$ in the first power semiconductor switch module 21 is turned off, the commutation circuit 4 flows through the fourth sub-busbar B4, the second power semiconductor switch module 23, the second busbar layer B5, the first power semiconductor switch module 21, the second sub-busbar B2, the clamping diode module 22 and the first busbar layer B6. In particular, the current path of the commutation loop 4 is: $C_{220}$-$E_{221}$/$C_{222}$-$C_{221}$-$E_{211}$/$C_{212}$-$E_{212}$-$C_{231}$-$E_{232}$-$C_{220}$, that is, the current path starts from an anode of C) the negative bus capacitor bank $C_{220}$, flows through the first layer busbar B6 to the third terminal $E_{221}$/$C_{222}$ of the clamping diode module 22, then run out from the first sub-terminals $C_{221}$ of the clamping diode module 22, flows through the second sub-busbar B2 to the third terminal $E_{211}$/$C_{212}$ of the first power semiconductor switch module 21, and then run out from the second sub-terminals $E_{212}$ of the first power semiconductor switch module 21, flows through the second busbar layer B5 to the first sub-terminals $C_{231}$ of the second power semiconductor switch module 23, run out from the second sub-terminals $E_{232}$ of the second power semiconductor switch module 23, and ends at the cathode of the negative bus capacitor bank $C_{220}$ through the fourth sub-busbar B4. Part of the second busbar layer B5 is formed at a panel different from the panel at which the second sub-busbar B2 is formed, and the commutation circuit 4 flows through the second sub-busbar B2. Furthermore, the part of the second busbar layer B5 completely covers the second sub-busbar B2; the first busbar layer B6 is formed at a panel different from the panel at which the fourth sub-busbar B4 and second busbar layer B5, and the commutation circuit 4 flows through the fourth sub-busbar B4 and second busbar layer B5. Furthermore, the first busbar layer B6 completely covers the fourth sub-busbar B4 and the second busbar layer B135. Therefore, the current path in the first busbar layer B6 coincides with the current path of the commutation circuit 4 which flows through the fourth sub-busbar B4 and second busbar layer BS5, and the directions of the current flowing through these paths are opposite. Consequently, the stray inductance is very small. The higher the coincidence degree of commutation loop 4 is, the smaller the stray inductance generated by the commutation loop 4 is.

In conclusion, the embodiment of the present disclosure provides mirror circuit for the commutation current, which is capable to shorten the path of current circuit, and effectively reduce stray inductance. Furthermore, connection position between each of the three busbar layers of the laminated busbar structure and the power switch module 20 does not need special treatment, therefore, the laminated busbar structure according to the present embodiment is simply and facilitates to be manufactured.

Embodiment 2 for a Power Unit

Figure 7:
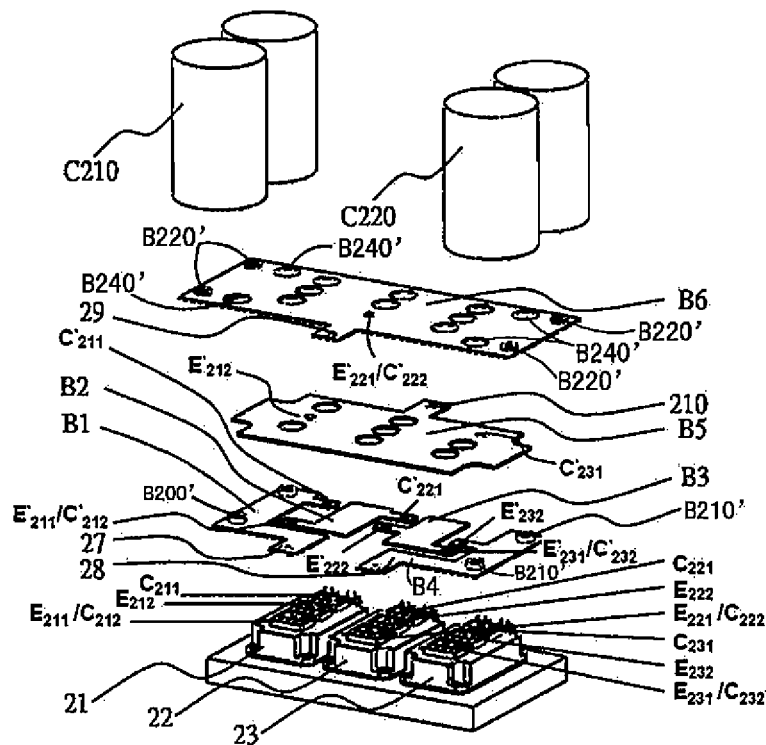
FIG. 7 illustrates an exploded view of a power unit according to a second embodiment of the present disclosure.

Referring to FIG. 7, the second embodiment of the present disclosure is different from that in the first embodiment as described below.

The laminated busbar structure in the second embodiment is adapted to a power switch module 20 having three connection terminals, that is, the first power semiconductor switch module 21 of the power switch module 20 comprises a first terminal, a second terminal and a third terminal. The first end comprises only one first sub-terminal $C_{211}$, and the second end comprises only one second sub-terminal $E_{212}$ The clamping diode module 22 of the power switch module 20 comprises a first terminal, a second terminal and a third terminal. The first end comprises only one first sub-terminal $C_{221}$, and the second end comprises only one second sub-terminal $E_{222}$. The second power semiconductor switch module 23 of the power switch module 20 comprises a first terminal, a second terminal and a third terminal. The first terminal comprises only one first sub-terminal $C_{231}$, and the second terminal comprises only one second sub-terminal $E_{232}$.

The arrangement of each connection hole in the laminated busbar structure according to the second embodiment will be described in detail as follow.

The first sub-busbar B1 comprises a connection hole $C'_{211}$ electrically connecting to the first sub-terminal $C_{211}$ of the first power semiconductor switch module 21.

The second busbar layer B5 comprises connection holes $E'_{212}$ and $C'_{231}$ respectively electrically connecting to the second sub-terminal $E_{212}$ of the first power semiconductor switch module 21 and the first sub-terminal $C_{231}$ of the second power semiconductor switch module 23.

The second sub-busbar B2 comprises connection holes $E'_{211}/C'_{212}$ and $C'_{221}$ respectively electrically connecting to the third terminal $E_{211}/C_{212}$ of the first power semiconductor switch module 21 and the first terminal of the clamping diode module 22.

The third sub-busbar B3 comprises connection holes $E'_{222}$ and $E'_{231}/C'_{232}$ respectively electrically connecting to the second sub-terminal $E_{222}$ of the clamping diode module 22 and the third terminal $E_{231}/C_{232}$ of the second power semiconductor switch module 23.

The fourth sub-busbar B4 comprises connection hole $E'_{232}$ electrically connecting to the second sub-terminal $E'_{232}$ of the second power semiconductor switch module 23.

The first busbar layer B6 comprises connection holes $E'_{221}/C'_{222}$ electrically connecting to the third terminal $E_{221}/C_{222}$ of the clamping diode module 22.

The second busbar layer B5 comprises through holes respectively corresponding to the connection hole $C'_{211}$ of the first sub-busbar B1, the connection holes $E'_{211}/C'_{212}$ and $C'_{221}$ of the second sub-busbar B2, the connection hole $E'_{232}$ of the fourth sub-busbar B4, the connection holes $E'_{222}$ and $E'_{231}/C'_{232}$ of the third sub-busbar B3, and connection hole $E'_{221}/C'_{222}$ of the first busbar layer B6.

The first busbar layer B6 comprises through holes respectively corresponding to the connection hole $C'_{211}$ of the first sub-busbar B1, the connection holes $E'_{211}/C'_{212}$ and $C'_{221}$ of the second sub-busbar B2, the connection holes $E'_{212}$ and $C'_{231}$ of the second busbar layer B5, the connection hole $E'_{232}$ of the fourth sub-busbar B4, and the connection holes $E'_{222}$ and $E'_{231}/C'_{232}$ of the third sub-busbar B3.

Other parts of the laminated busbar structure in the second embodiment are the same as that of the first embodiment mentioned above and the detailed description is omitted herein.

Figure 8:
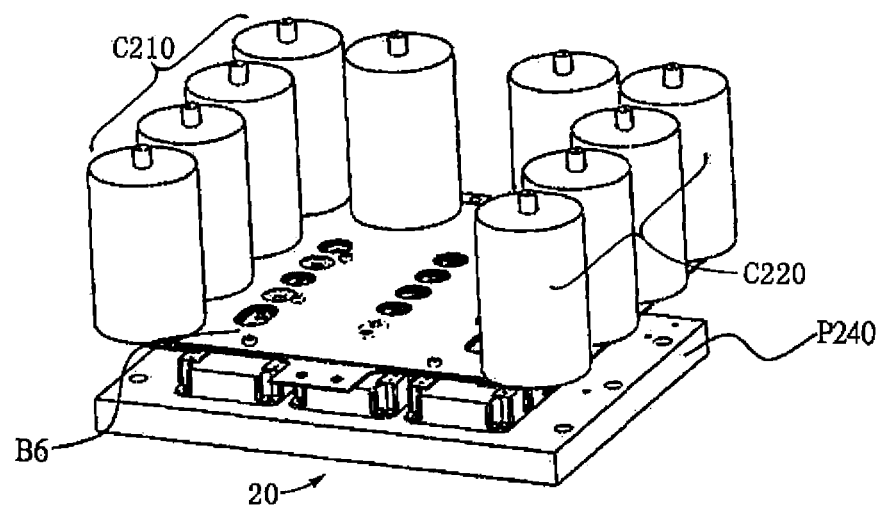
FIG. 8 illustrates a perspective schematic view showing relationship among the power switch module, the laminated busbar and a capacitor bank in the power unit according to an embodiment of the present disclosure.
Figure 9:
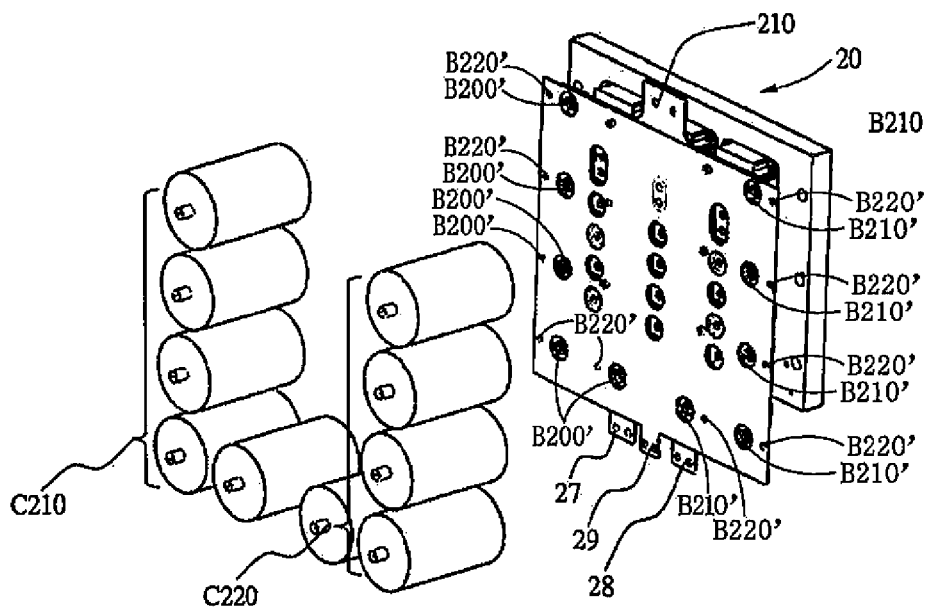
FIG. 9 illustrates an exploded view showing relationship among the power switch module, the laminated busbar and the capacitor bank in the power unit as shown in FIG. 8.

Referring to FIG. 8 and FIG. 9, in other embodiments, the power unit may further comprise positive bus capacitor bank composed of a plurality of capacitors $C_{210}$, and negative bus capacitor bank composed of a plurality of capacitors $C_{220}$. The capacitors $C_{210}$ in the positive bus capacitor bank is electrically connected between the positive DC end P and neutral point voltage end NP. The capacitors $C_{220}$ in the negative bus capacitor bank is electrically connected between the negative DC end N and neutral point voltage end NP.

Referring to FIG. 5B, FIG. 8 and FIG. 9, in an embodiment, the first sub-busbar B1 comprises a plurality of first capacitor connection holes B200'. The fourth sub-busbar B4 comprises a plurality of second capacitor connection holes B210'. The first busbar layer B6 comprises a plurality of third capacitor connection holes B220'. The first busbar layer B6 comprises through holes B240' respectively corresponding to the first capacitor connection holes B200' and the second capacitor connection holes B210'. The second busbar layer B5 comprises through holes respectively corresponding to the first capacitor connection holes B200' and the second capacitor connection holes B210'. In other embodiments, in case that the projection region of the second busbar layer B5 on the power switch module 20 only covers the second sub-busbar B2 and the third sub-busbar B3 of the third layer busbar, the second busbar layer B5 does not need to be provided with any through hole at position corresponding to the first capacitor connection holes B200' and second capacitor connection holes B210'.

In the power unit one end of the capacitors $C_{210}$ in the positive bus capacitor bank respectively connects to the first capacitor connection holes B200', and one end of the capacitors $C_{220}$ in the negative bus capacitor bank respectively connects to the second capacitor connection holes B210'. The other end of the capacitors $C_{210}$ in the positive bus capacitor bank and the other end of the capacitors $C_{220}$ in the negative bus capacitor bank respectively connects to the third capacitor connection holes B220'.

In an embodiment, the capacitors $C_{210}$ in the positive bus capacitor bank and the capacitors $C_{220}$ in the negative bus capacitor bank are arranged symmetrically. The first sub-busbar B1, the second sub-busbar B2, the third sub-busbar B3 and the fourth sub-busbar B4 of the third busbar layer are arranged in order, and the positive bus capacitor bank is set adjacent to a side of the first sub-busbar B1, and the negative bus capacitor bank is set adjacent to a side of the fourth sub-busbar B4. The capacitors $C_{210}$, $C_{220}$ directly connect to the laminated busbar structure, and the stray inductance between the capacitors and the busbar is the smallest, which facilitate the reduction stray inductance in the power converter.

Embodiment 3 for a Power Unit

Figure 10:
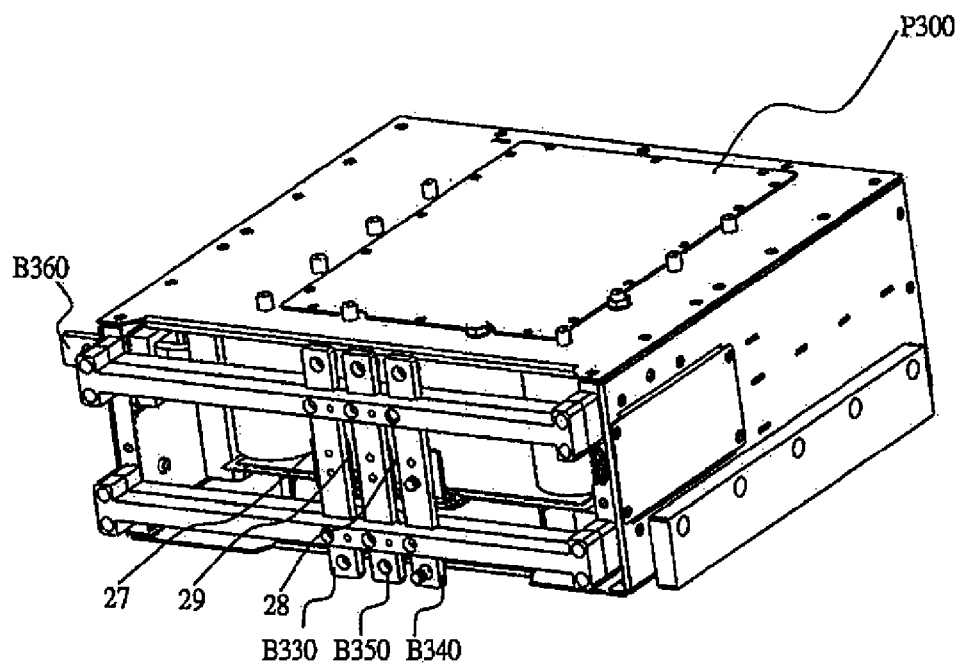
FIG. 10 illustrates a perspective schematic view of a power unit according to a third embodiment of the present disclosure.

Referring to FIG. 10, the power unit P300 according to an embodiment of the present disclosure comprises a housing structure, a power switch module 20 in the housing structure, laminated busbar structure, positive bus capacitor bank and negative bus capacitor bank. The power switch module 20 is the one as mentioned before in the present disclosure. The first connection terminal 27 of the power switch module 20 connects to a positive bus input conductor B330, the second connection terminal 28 connects to a negative bus input conductor B340, the third connection terminal 29 connects to a neutral point bus input conductor B350, and the fourth connection terminal 210 connects to an AC bus conductor B360.

The positive bus input conductor B330, the negative bus input conductor B340, the neutral point bus input conductor B350 and the AC bus conductor B360 fix to the housing structure respectively in an insulation circumstance.

Embodiment of the Three-Level Power Converter

Figure 11:
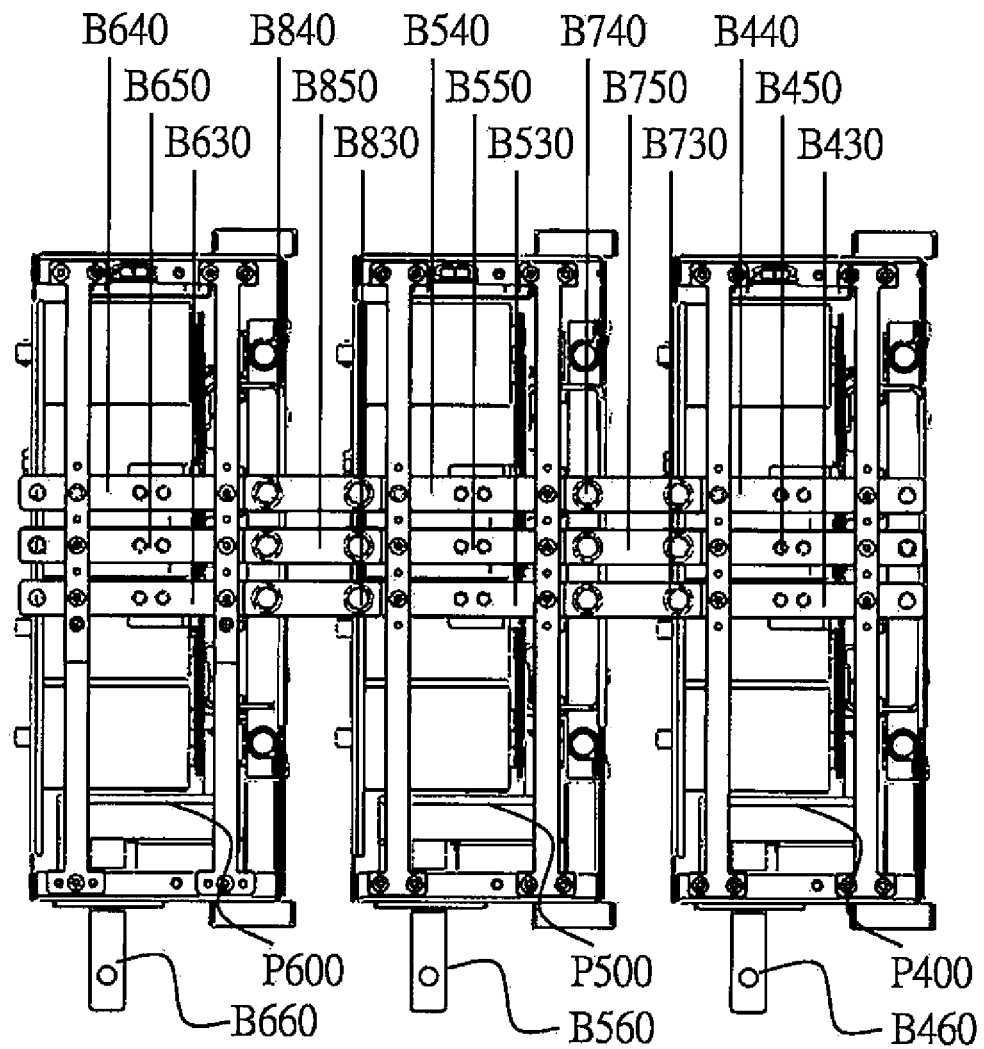
FIG. 11 illustrates a perspective schematic view of a three-level power converter according to an embodiment of the present disclosure.

Referring to FIG. 11, the three-level power converter in an embodiment according to the present disclosure comprises three power units, such as a first power unit P400, a second power unit P500 and a third power unit P600. The three power units constitute a three-phase converter comprising a rectifier part or inverter part. The number of the power unit is not limited to 3. In other embodiments, the number of the power unit may be 6 which may constitute a six-phase converter comprising a rectifier part or inverter part.

The first power unit P400 comprises a positive bus input conductor B430, a negative bus input conductor B440, a neutral point bus input conductor B450 and an AC bus conductor B460.

The second power unit P500 comprises a positive bus input conductor B530, a negative bus input conductor B540, a neutral point bus input conductor B550 and an AC bus conductor B560.

The third power unit P600 comprises a positive bus input conductor B630, a negative bus input conductor B640, a neutral point bus input conductor B650 and an AC bus conductor B660.

Interconnection conductors B730, B740 and B750 are respectively connected between the positive bus input conductor B430 of the first power unit P400 and positive bus input conductor B530 of the second power unit P500, between the negative bus input conductor B440 of the first power unit P400 and negative bus input conductor B540 of the second power unit P500, between the neutral point bus input conductor B450 of the first power unit P400 and neutral point bus input conductor B550 of the second power unit P500.

Interconnection conductors B830, B840 and B850 are respectively connected between the positive bus input conductor B530 of the second power unit P500 and positive bus input conductor B630 of the third power unit P600, between the negative bus input conductor B540 of the second power unit P500 and negative bus input conductor B640 of the third power unit P600, between the neutral point bus input conductor B550 of the second power unit P500 and neutral point bus input conductor B650 of the third power unit P600.

In the laminated busbar structure according to the present disclosure, three layers of laminated busbar structure are laminated layer by layer, such that the structure may be compact, installation is easy, and current flowing through the three layers of busbar structure are symmetrical and in the opposite direction, thus effectively reducing parasitic inductor of the power unit in the three-level power converter, and reducing voltage stress of the power switch module.

It should be noted that the above embodiments are only illustrated for describing the technical solution of the disclosure and not restrictive, and although the embodiments are described in detail by referring to the aforesaid embodiments, the skilled in the art should understand that the aforesaid embodiments may be modified and portions of the technical features therein may be equally changed, which does not depart from the spirit and scope of the technical solution of the embodiments of the disclosure.

What is claimed is:

1. A power unit comprising a power switch module and a laminated busbar structure, wherein,
   the power switch module comprising:
      a first power semiconductor switch module having a first terminal, a second terminal and a third terminal;
      a clamping diode module having a first terminal, a second terminal and a third terminal; and
      a second power semiconductor switch module having a first terminal, a second terminal and a third terminal;
   the laminated busbar structure comprising a third busbar layer, a second busbar layer and a first busbar layer laminated on the power switch module; wherein,
      the first busbar layer electrically connects to the third terminal of the clamping diode module;
      the second busbar layer electrically connects to the second terminal of the first power semiconductor switch module and the first terminal of the second power semiconductor switch module respectively;
      the third busbar layer comprises a first sub-busbar, a second sub-busbar, a third sub-busbar and a fourth sub-busbar;
      the first sub-busbar electrically connects to the first terminal of the first power semiconductor switch module;
      the second sub-busbar electrically connects to the third terminal of the first power semiconductor switch module and the first terminal of the clamping diode module respectively;

the third sub-busbar electrically connects to the second terminal of the clamping diode module and the third terminal of the second power semiconductor switch module respectively; and the fourth sub-busbar electrically connects to the second end of the second power semiconductor switch module.

2. The power unit according to claim 1, wherein an insulation structure is set between every two of the third busbar layer, the second busbar layer and the first busbar layer.

3. The power unit according to claim 1, wherein, the first sub-busbar comprises a connection hole electrically connecting to the first terminal of the first power semiconductor switch module;

the second busbar layer comprises a connection hole electrically connecting to the second terminal of the first power semiconductor switch module;

the second sub-busbar comprises a connection hole electrically connecting to the third terminal of the first power semiconductor switch module;

the second busbar layer comprises through holes respectively corresponding to the connection hole of the first sub-busbar and the connection hole of the second sub-busbar;

the first busbar layer comprises through holes respectively corresponding to the connection hole of the first sub-busbar, the connection hole of the second sub-busbar and the connection hole of the second busbar layer.

4. The power unit according to claim 1, wherein, the second sub-busbar comprises a connection hole electrically connecting to the first terminal of the clamping diode module;

the third sub-busbar comprises a connection hole electrically connecting to the second terminal of the clamping diode module;

the first busbar layer comprises a connection hole electrically connecting to the third terminal of the clamping diode module;

the second busbar layer comprises through holes respectively corresponding to the connection hole of the second sub-busbar, the connection hole of the third sub-busbar and the connection hole of the first layer busbar; and the first busbar layer comprises through holes respectively corresponding to the connection hole of the second sub-busbar and the connection hole of the third sub-busbar.

5. The power unit according to claim 1, wherein, the second busbar layer comprises a connection hole electrically connecting to the first terminal of the second power semiconductor switch module;

the fourth sub-busbar comprises a connection hole electrically connecting to the second terminal of the second power semiconductor switch module;

the third sub-busbar comprises connection holes electrically connecting to the third terminal of the second power semiconductor switch module;

the second busbar layer comprises through holes respectively corresponding to the connection hole of the fourth sub-busbar and the connection hole of the third sub-busbar; and the first busbar layer comprises through holes respectively corresponding to the connection hole of the fourth sub-busbar, the connection hole of the third sub-busbar and the connection hole of the second busbar layer.

6. The power unit according to claim 1, wherein, the first terminal of the first power semiconductor switch module comprises two first sub-terminals connected with each other, and the first sub-busbar comprises two connection holes electrically connecting to the two first sub-terminals respectively;

the second terminal of the first power semiconductor switch module comprises two second sub-terminals connected with each other, and the second busbar layer comprises two connection holes electrically connecting to the two second sub-terminals respectively;

the second sub-busbar comprises a connection hole electrically connecting to the third terminals of the first power semiconductor switch module;

the second busbar layer comprises through holes respectively corresponding to the connection holes of the first sub-busbar and the connection hole of the second sub-busbar; and the first busbar layer comprises through holes respectively corresponding to the connection holes of the first sub-busbar, the connection holes of the second sub-busbar and the connection hole of the second busbar layer.

7. The power unit according to claim 1, wherein, the first terminal of the clamping diode module comprises two first sub-terminals connected with each other, and the second sub-busbar comprises two connection holes electrically connecting to the two first sub-terminals respectively;

the second terminal of the clamping diode module comprises two second sub-terminals connected with each other, and the third sub-busbar comprises two connection holes electrically connecting to the two second sub-terminals respectively;

the first busbar layer comprises a connection hole electrically connecting to the third terminal of the clamping diode module;

the second busbar layer comprises through holes respectively corresponding to the connection holes of the second sub-busbar, the connection holes of the third sub-busbar and the connection hole of the first busbar layer; and the first busbar layer comprises through holes respectively corresponding to the connection holes of the second sub-busbar and the connection holes of the third sub-busbar.

8. The power unit according to claim 1, wherein, the first terminal of the second power semiconductor switch module comprises two first sub-terminals connected with each other, and the second busbar layer comprises two connection holes electrically connecting to the two first sub-terminals respectively;

the second end of the second power semiconductor switch module comprises two second sub-terminals connected with each other, and the fourth sub-busbar layer comprises two connection holes electrically connecting to the two second sub-terminals respectively;

the third sub-busbar comprises a connection hole electrically connecting to the third terminal of the second power semiconductor switch module;

the second busbar layer comprises through holes respectively corresponding to the connection holes of the fourth sub-busbar and the connection hole of the third sub-busbar; and the first busbar layer comprises through holes respectively corresponding to the connection holes of the fourth sub-busbar, the connection hole of the third sub-busbar and the connection holes of the second busbar layer.

9. The power unit according to claim 1, wherein,
the first sub-busbar comprises a first connection terminal configured to connect to a positive DC end;
the fourth sub-busbar comprises a second connection terminal configured to connect to a negative DC end;
the first busbar layer comprises a third connection terminal configured to connect to a neutral point voltage end; and
the second busbar layer comprises a fourth connection terminal configured to connect to an AC end.

10. The power unit according to claim 9, wherein, further comprises a positive bus capacitor bank electrically connected between the positive DC end and neutral point voltage end, and a negative bus capacitor bank electrically connected between the negative DC end and neutral point voltage end;
the first sub-busbar comprises a plurality of first capacitor connection holes, and the fourth sub-busbar comprises a plurality of second capacitor connection holes;
the first busbar layer comprises a plurality of third capacitor connection holes, and the first busbar layer comprises through holes respectively corresponding to the first capacitor connection holes and second capacitor connection holes; and
the second busbar layer comprises through holes respectively corresponding to the first capacitor connection holes and second capacitor connection holes;
wherein, one end of the positive bus capacitor bank respectively connects to the first capacitor connection holes, and one end of the negative bus capacitor bank respectively connects to the second capacitor connection holes; the other end of the positive bus capacitor bank and the other end of the negative bus capacitor bank respectively connects to the third capacitor connection holes.

11. The power unit according to claim 10, wherein,
the first sub-busbar, the second sub-busbar, the third sub-busbar and the fourth sub-busbar are arranged in order, and the positive bus capacitor bank is set adjacent to a side of the first sub-busbar, and the negative bus capacitor bank is set adjacent to a side of the fourth sub-busbar.

12. A three-level power converter comprising a plurality of power units according to claim 9, the first connection terminals of the laminated busbar structure of each power unit are connected with each other by a conductor; the second connection terminals of the laminated busbar structure of each power unit are connected by a conductor; and the third connection terminals of the laminated busbar structure of each power unit are connected by a conductor.

13. The three-level power converter according to claim 12, wherein the number of the power unit is 3 or 6.

14. The power unit according to claim 1, wherein,
the third busbar layer is set on the power switch module, the first busbar layer is set on the third busbar layer, and the second busbar layer is set on the first busbar layer.

15. The power unit according to claim 14, wherein, the projection region of the first busbar layer on the power switch module completely covers the projection region of the third busbar layer on the power switch module.

16. The power unit according to claim 14, wherein, the projection region of the second busbar layer on the power switch module at least covers the projection region of the second sub-busbar and the third sub-busbar of the third busbar layer on the power switch module.

17. The power unit according to claim 1, wherein, the third busbar layer is set on the power switch module, the second busbar layer is set on the third busbar layer, and the first busbar layer is set on the second busbar layer.

18. The power unit according to claim 1, wherein,
the first power semiconductor switch module comprises a first power semiconductor switch and a second power semiconductor switch connected with each other in series;
the second power semiconductor switch module comprises a third power semiconductor switch and a fourth power semiconductor switch connected with each other in series.

19. The power unit according to claim 18, wherein,
the first power semiconductor switch module further comprises a first fly-wheel diode connected in parallel with the first power semiconductor switch, and a second fly-wheel diode connected in parallel with the second power semiconductor switch;
the second power semiconductor switch module further comprises a third fly-wheel diode connected in parallel with the third power semiconductor switch, and a fourth fly-wheel diode connected in parallel with the fourth power semiconductor switch.

* * * * *